Sept. 14, 1926.
L. W. COE
VEHICLE SEAT
Filed Feb. 26, 1925
1,599,555
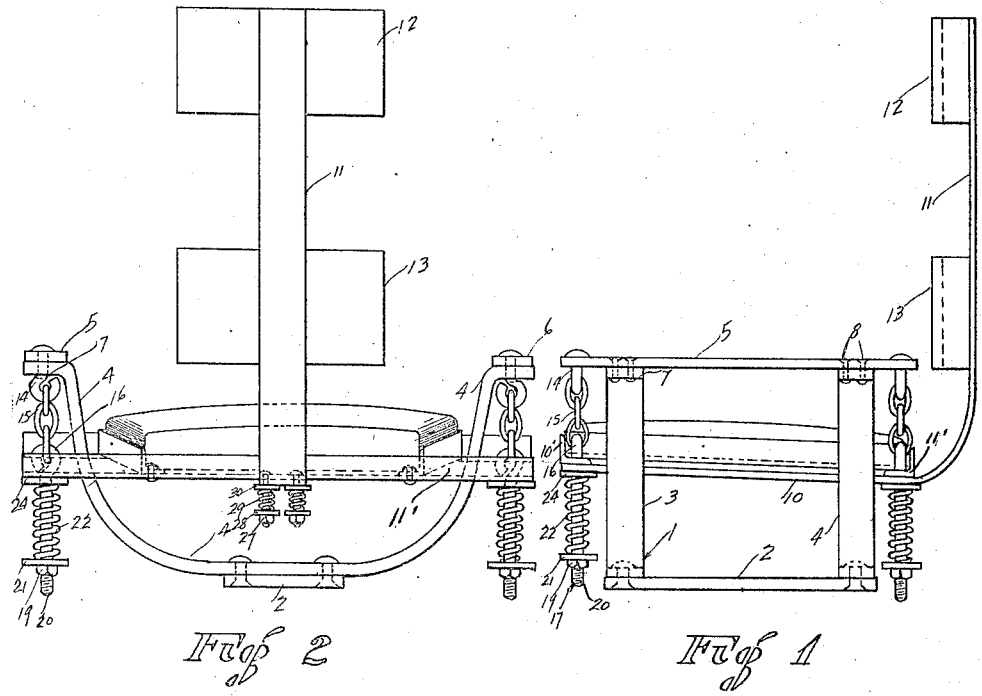
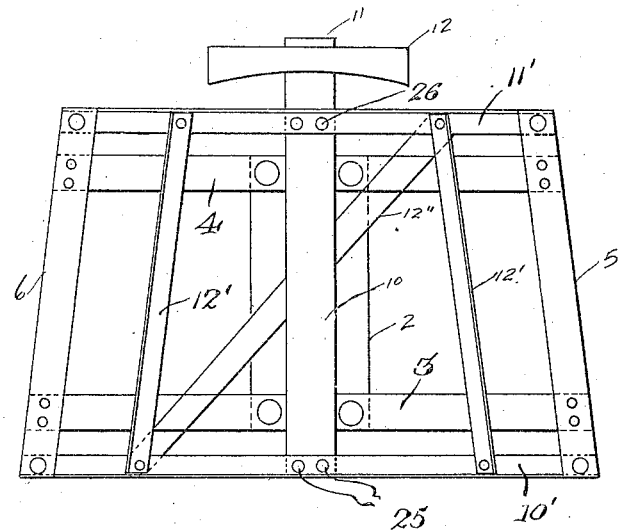
INVENTOR
L.W. COE
ATTY.

Patented Sept. 14, 1926.

1,599,555

UNITED STATES PATENT OFFICE.

LESTER W. COE, OF ORLAND, CALIFORNIA.

VEHICLE SEAT.

Application filed February 26, 1925. Serial No. 11,661.

This invention resides in the provision of a swinging spring seat for vehicles particularly agricultural vehicles, such as plows, cultivators, tractors and the like.

The primary object of the invention is to provide a simply constructed, comparatively inexpensive seat which may be readily and easily attached to vehicles and which will prove exceptionally comfortable, strong and durable.

One of the objects of the invention is to provide a vehicle seat of the character described in which the seat may freely swing in any direction to a limited extent while being cushioned through the agency of a special spring arrangement, the said seat being suspended from a substantially constructed supporting means which permits of a swinging, yielding supporting of the seat and insures the comfort of the occupant thereof.

A further object is to provide a seat of the character described in which the seat supporting means serves in part as arm rests.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 represents a side elevation of a seat constructed in accordance with my invention.

Fig. 2 is a rear elevation of the seat of my invention. Fig. 3 is a top plan view of the seat with the seat member removed.

The embodiment of the invention illustrated in the accompanying drawing comprising a seat supporting cradle generally designated 1, which consists of an attaching plate or bar 2 adapted to be secured to some convenient part of the vehicle to which the seat is to be attached. Fastened to the ends of the bar or plate 2 are substantially U-shaped supporting bars 3 and 4. Extending between the bars 3 and 4 and fastened to the upper ends thereof are horizontal suspension bars 5 and 6. The upper ends of the bars 3 and 4 are bent laterally as at 7 and constitute supports for the bars 5 and 6, being secured thereto by suitable fastenings 8 in such manner that the ends of the bars 5 and 6 extend beyond the laterally turned portion 7. This cradle structure is simple, inexpensive, strong and capable of being readily and easily attached to the vehicle so that the seat may be effectively supported therefrom.

The seat comprises a rectilinear seat frame 9 of skeleton construction including a cross plate 10 which is curved upwardly and rearwardly to serve as a back rest 11, there being suitable cross pieces 12 and 13 extending transversely on the back rest and which may be cushioned or upholstered in any suitable manner. The seat frame includes front and rear channel iron pieces 10' and 11'. Joining these pieces 10' and 11' and spaced inwardly from the outer ends thereof are similar side bars 12'. Other cross pieces or brace members may be employed as desired to join these particular pieces of the seat frame, for example, the bar 12''.

Extending downwardly from the ends of the bars 5 and 6 are eye bolts 14 from which depend flexible elements 15 in the form of chains. The lower links of these chains are inserted through the eyes 16 of the eye bolts 17, which bolts are passed through openings in the outer extremities of the bars 10' and 11'. The eye bolts extend below the seat frame and have nuts 19 turned on their lower screw threaded ends 20. These nuts support cup washers 21 against which washers the lower ends of helical expansion springs 22 engage, the springs being mounted on the bolts. The upper ends of the springs engage similar cup washers 24 disposed upon the under side of the bars 10' and 11'. Thus the springs yield incident to weight being carried by the seat and provide for an effective cushioning action. The chains 15 permit the seat to swing freely in all directions and the combined swinging and cushioning actions provided by this arrangement insure a comfortable and secure seat especially adapted for agricultural vehicles which are required to negotiate rough and irregular ground.

The cross piece 10 of the seat frame is secured at its forward end by fastenings 25 to the front part of the seat frame. Bolts 26 are inserted through the rear part of the seat frame and through the plate 10. These bolts have nuts 27 turned on their lower end, which nuts support cup washers 28 engaged by the lower ends of expansion springs 29. The springs are mounted on the bolts and their upper ends engage cup washers 30, which contact with the lower side of the plate 10. When the seat is occupied and the occupant leans on the back rest, the springs 29 yield and provide a cushioning action which insures the comfort of the occupant of the seat. The bars 5 and 6 serve as arm rests. The U-shaped bars being disposed between the seat frame member 10' and 11' provide for limiting the swinging movement of the seat, as these bars 10' and 11' will strike the U-shaped bars in the forward or rearward swinging of the seat member.

I claim:

1. A vehicle seat comprising a cradle structure adapted to be attached to a vehicle, flexible elements depending from the structure, a seat member, bolts extending through corners of the seat member and to the upper ends of which said flexible elements are attached, springs mounted on the bolts and abutment members on the bolts between which and the seat member said springs engage.

2. A vehicle seat comprising a cradle structure, a seat frame extending above which are portions of said cradle structure, flexible elements depending from the upper portions of the cradle structure, bolts extending through the corners of the seat frame and to the upper ends of which said flexible elements are connected and springs associated with the bolts to take up the load of the seat when the latter is occupied.

3. A vehicle seat comprising an attaching plate adapted to be secured to a vehicle to which the seat is to be attached, U-shaped bars secured intermediate of their ends to said attaching plate, substantially horizontal bars connecting the upper ends of the U-shaped bars, a seat member, flexible elements depending from the substantially horizontal bars, eye bolts extending through the seat member and to which said flexible elements are attached, nuts supported on the lower portions of the eye bolts, washers supported by the nuts, expansion springs mounted on the bolts with their lower ends engaging the washers and similar washers engaged with the under part of the seat frame and upper ends of said springs.

LESTER W. COE.